Figure 1:
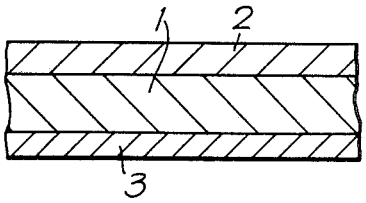
Figure 2:
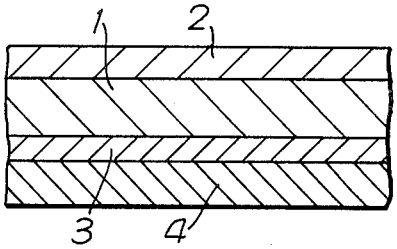
Figure 3:
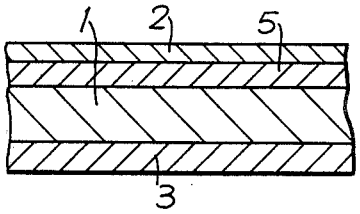
Figure 4:
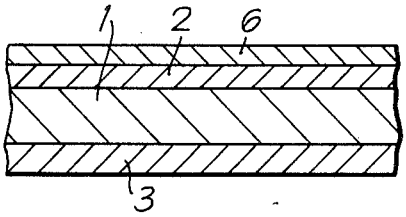

United States Defensive Publication [19] (H) [11] T977,002

Huffey et al. [43] Dec. 5, 1978

[54] VESICULAR RECORDING MATERIALS HAVING AN ADHESIVE LAYER

[75] Inventors: Roy F. Huffey, Ipswich; David E. Lothian, Colchester; Stuart C. Rennison, Hadleigh; Michael K. Titman, Colchester, all of England

[73] Assignee: Bexford Limited Imperial Chemical House, London, England

[21] Appl. No.: 843,059

[22] Filed: Oct. 17, 1977

[30] Foreign Application Priority Data

Jul. 7, 1977 [GB] United Kingdom ..... 28533/77

[51] Int. Cl.[2] ..... G03C 1/52; G03C 1/40; G03C 1/90; G03C 1/78

[52] U.S. Cl. ..... 96/75; 96/77; 96/83; 96/87 R

[57] ABSTRACT

Light-sensitive vesicular imaging materials, suitable for the production of labels, etc., comprise a light-sensitive vesicular imaging layer applied to one surface of an opaque self-supporting plastics sheet or film, preferably a polyester film, e.g., an oriented and heat-set film of polyethylene terephthalate, said light-sensitive vesicular imaging layer comprising a polymeric vehicle having uniformly dispersed therein a sensitizing agent which releases a vesicle-forming gas upon exposure to light and may comprise a nitrogen-liberating diazonium salt, said polymeric vehicle comprising a thermoplastic polymer having a nitrogent permeability constant (as defined in the specification) in the range of $1 \times 10^{-15}$ to $1 \times 10^{-10}$ and being softenable upon heading above ambient temperature to permit the gas released by the sensitizing agent in the light-struck areas to form light scattering or reflecting vesicles therein, and an adhesive layer applied to the other surface of the sheet or film. The imaging layer may be pigmented or dyed or a pigmented or dyed layer may be applied over the imaging layer or between it and the plastics sheet or film. Imaging may be achieved by conventional vesicular imaging techniques.

12 Claims, 1 Sheet Drawing,

17 Pages Specification

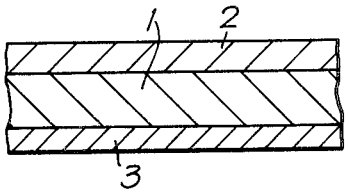

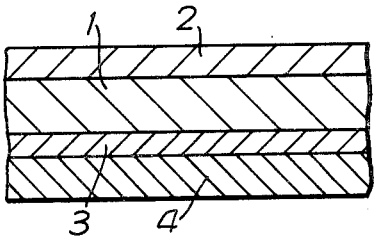

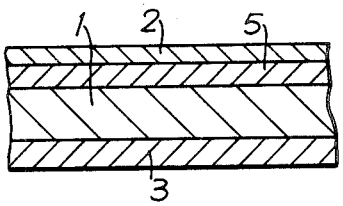

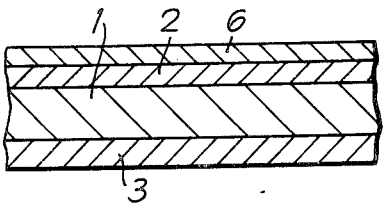

The file of this unexamined application may be inspected and copies thereof may be purchased (849 O.G. 1221, Apr. 9, 1968).